Figure 11:
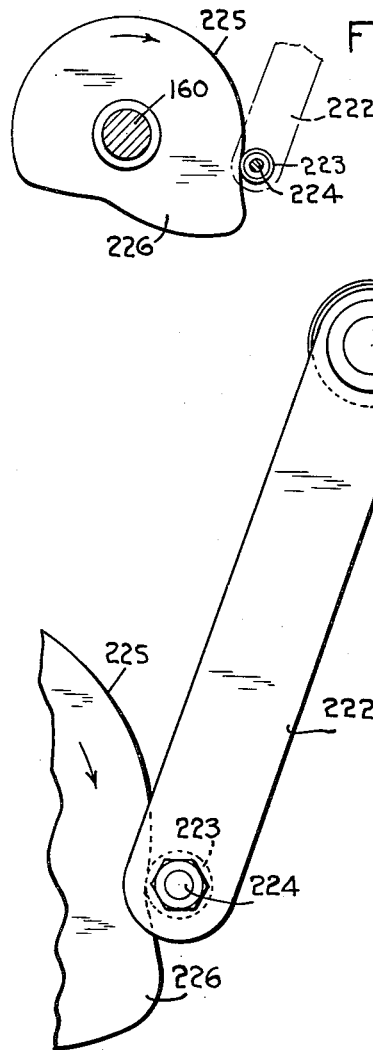

Dec. 20, 1960     C. HEPNER ET AL     2,965,247
POSITIONING APPARATUS
Filed July 1, 1955     11 Sheets-Sheet 1
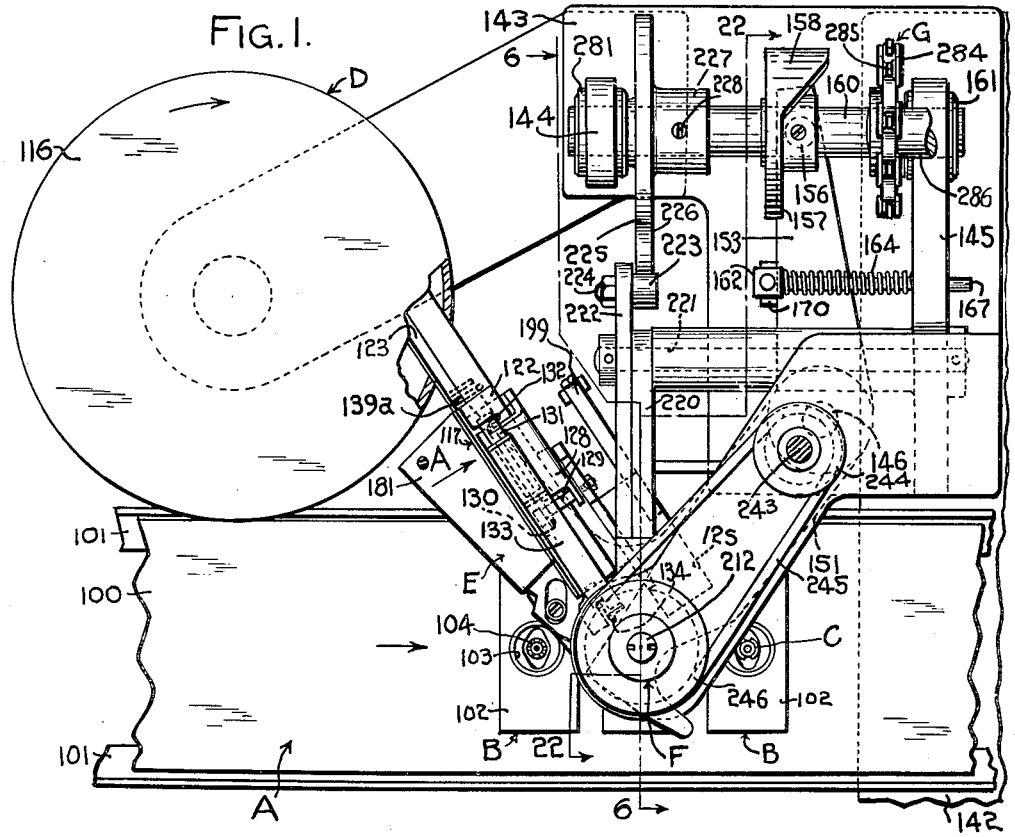
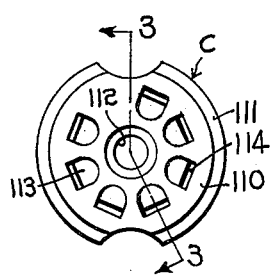
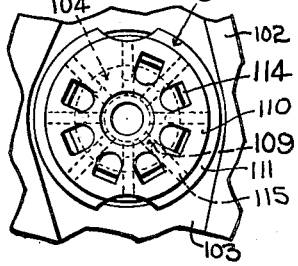
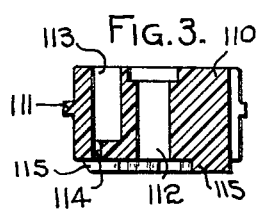
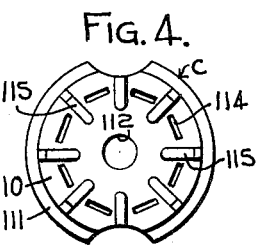
INVENTORS:
ARTHUR C. PETERS,
CHARLES HEPNER,
BY John Todd
         ATTORNEY.

Dec. 20, 1960 C. HEPNER ET AL 2,965,247
POSITIONING APPARATUS
Filed July 1, 1955 11 Sheets-Sheet 2
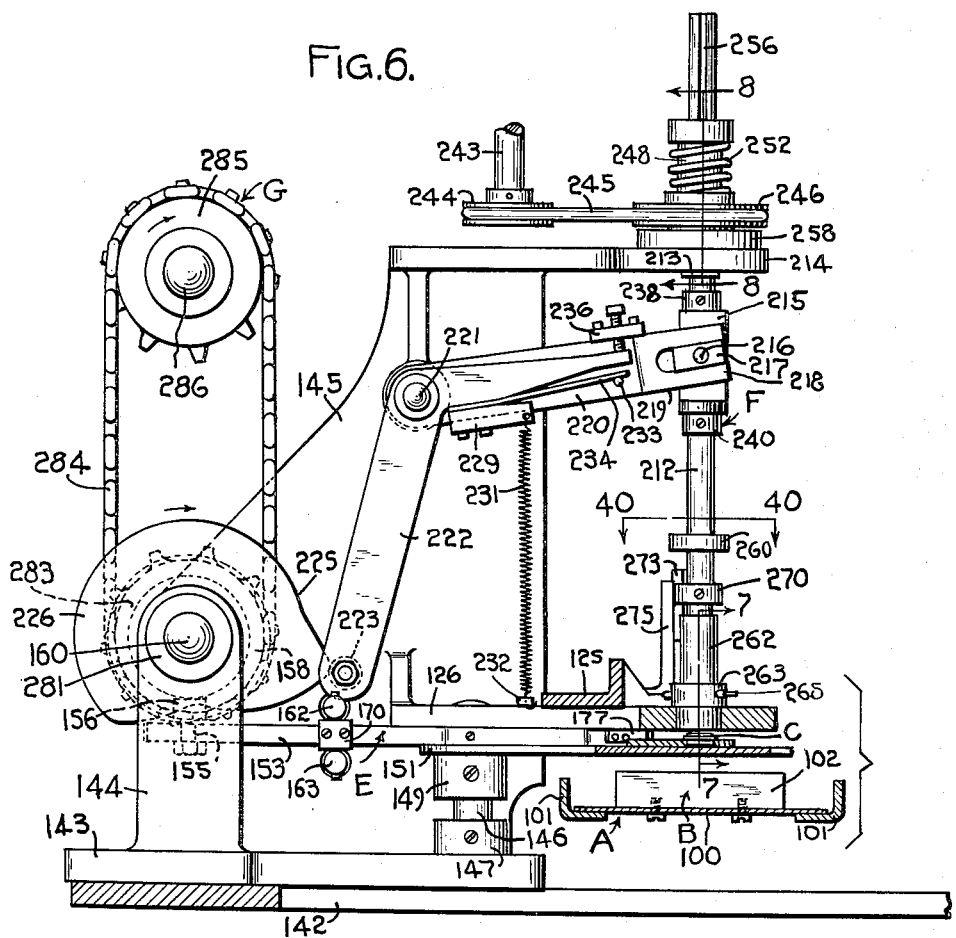
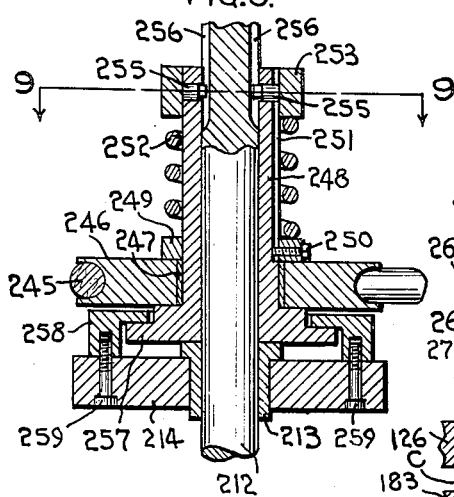
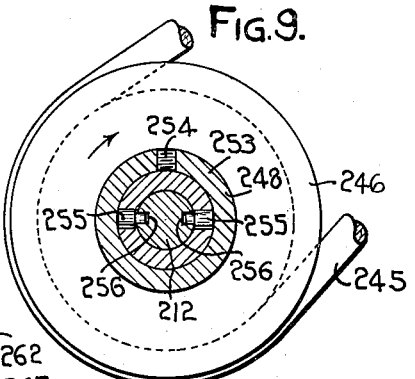
INVENTORS:
ARTHUR C. PETERS,
CHARLES HEPNER,
BY John Todd
ATTORNEY.

Dec. 20, 1960   C. HEPNER ET AL   2,965,247
POSITIONING APPARATUS
Filed July 1, 1955   11 Sheets-Sheet 3

INVENTORS:
ARTHUR C. PETERS,
CHARLES HEPNER,
BY John Todd
ATTORNEY.

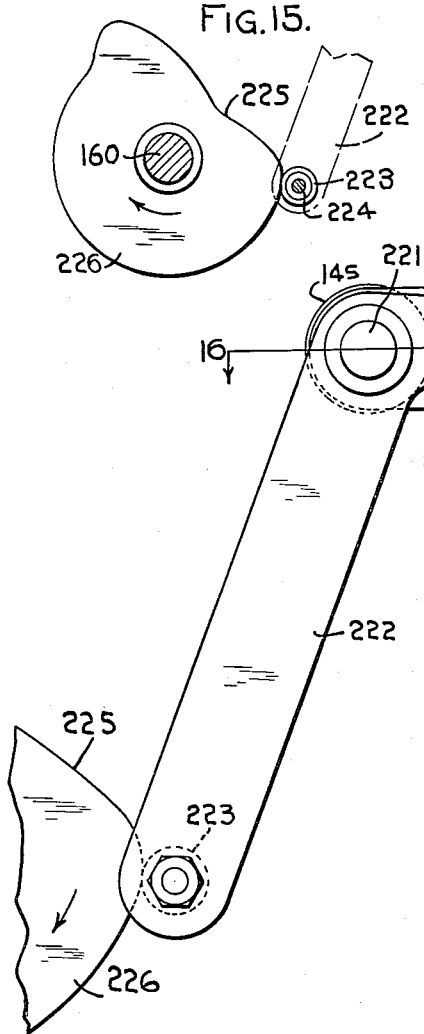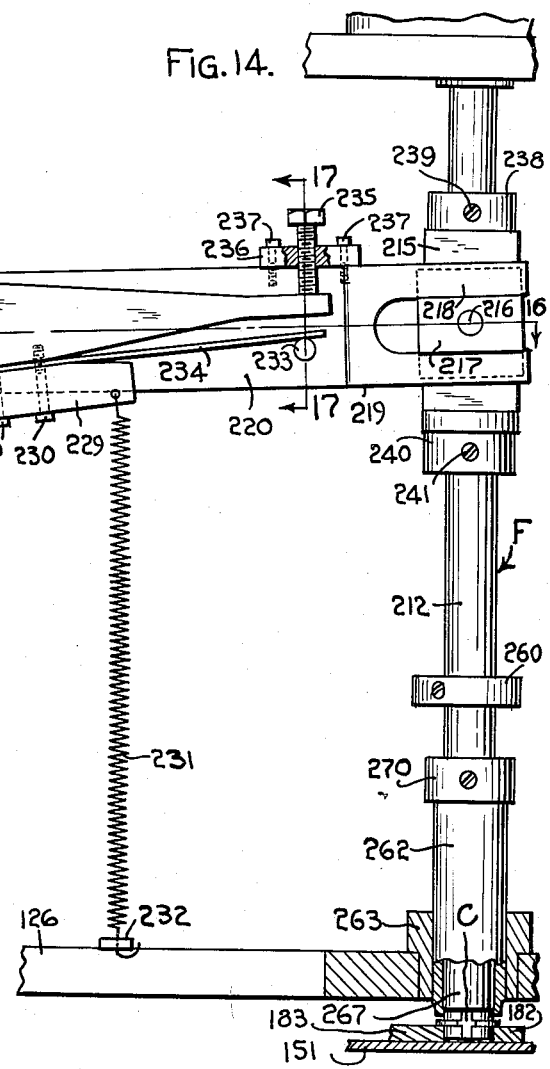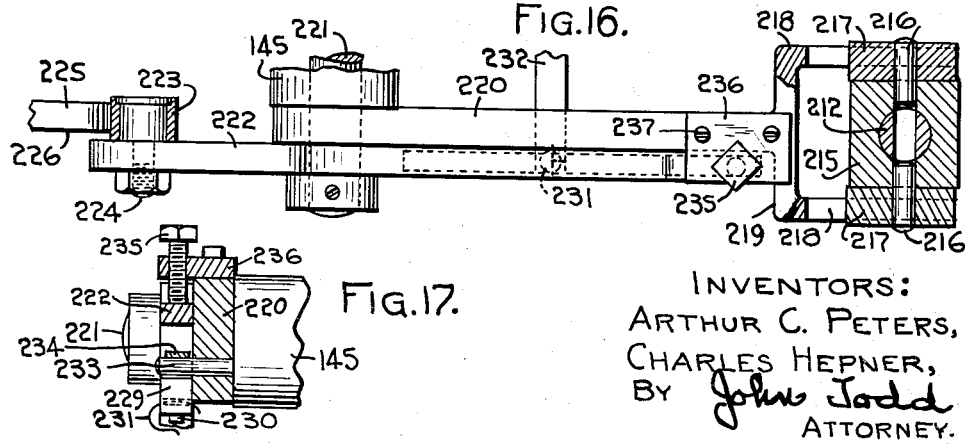

Dec. 20, 1960
C. HEPNER ET AL
2,965,247
POSITIONING APPARATUS
Filed July 1, 1955
11 Sheets-Sheet 5
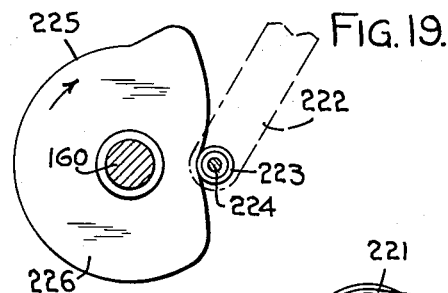
FIG. 19.
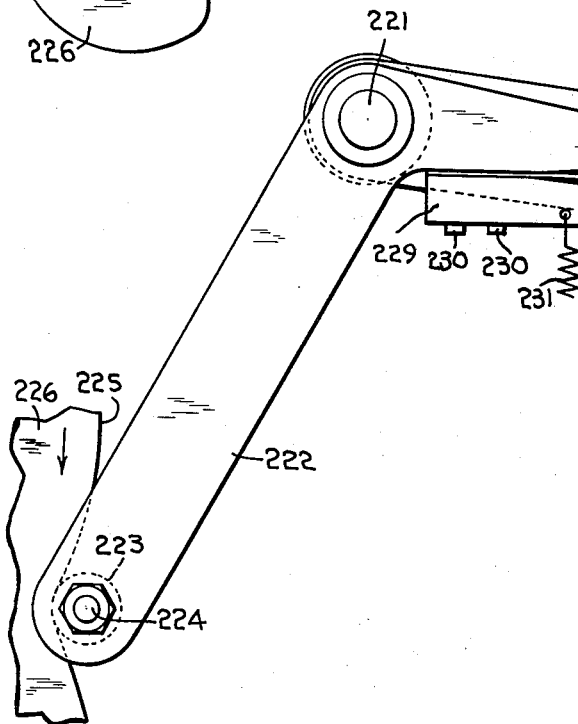
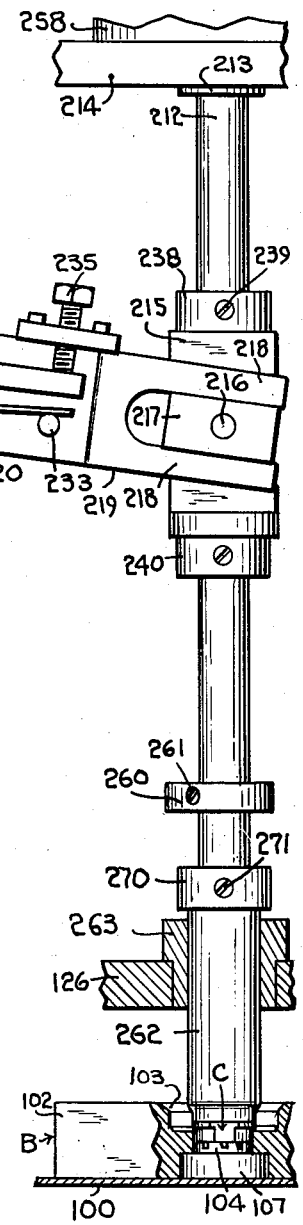
FIG. 18.
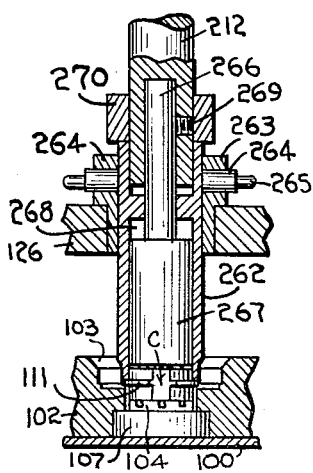
FIG. 20.
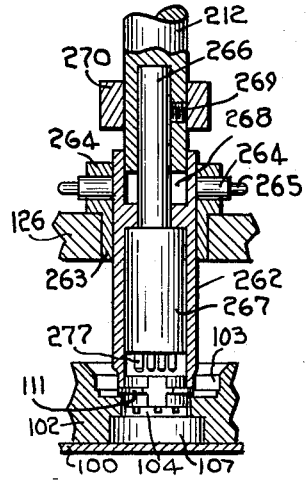
FIG. 21.
INVENTORS:
ARTHUR C. PETERS,
CHARLES HEPNER,
BY John Todd
ATTORNEY.

Dec. 20, 1960  C. HEPNER ET AL  2,965,247
POSITIONING APPARATUS
Filed July 1, 1955  11 Sheets-Sheet 6

INVENTORS:
ARTHUR C. PETERS,
CHARLES HEPNER,
BY John Todd
ATTORNEY.

Dec. 20, 1960
C. HEPNER ET AL
2,965,247
POSITIONING APPARATUS
Filed July 1, 1955
11 Sheets-Sheet 7
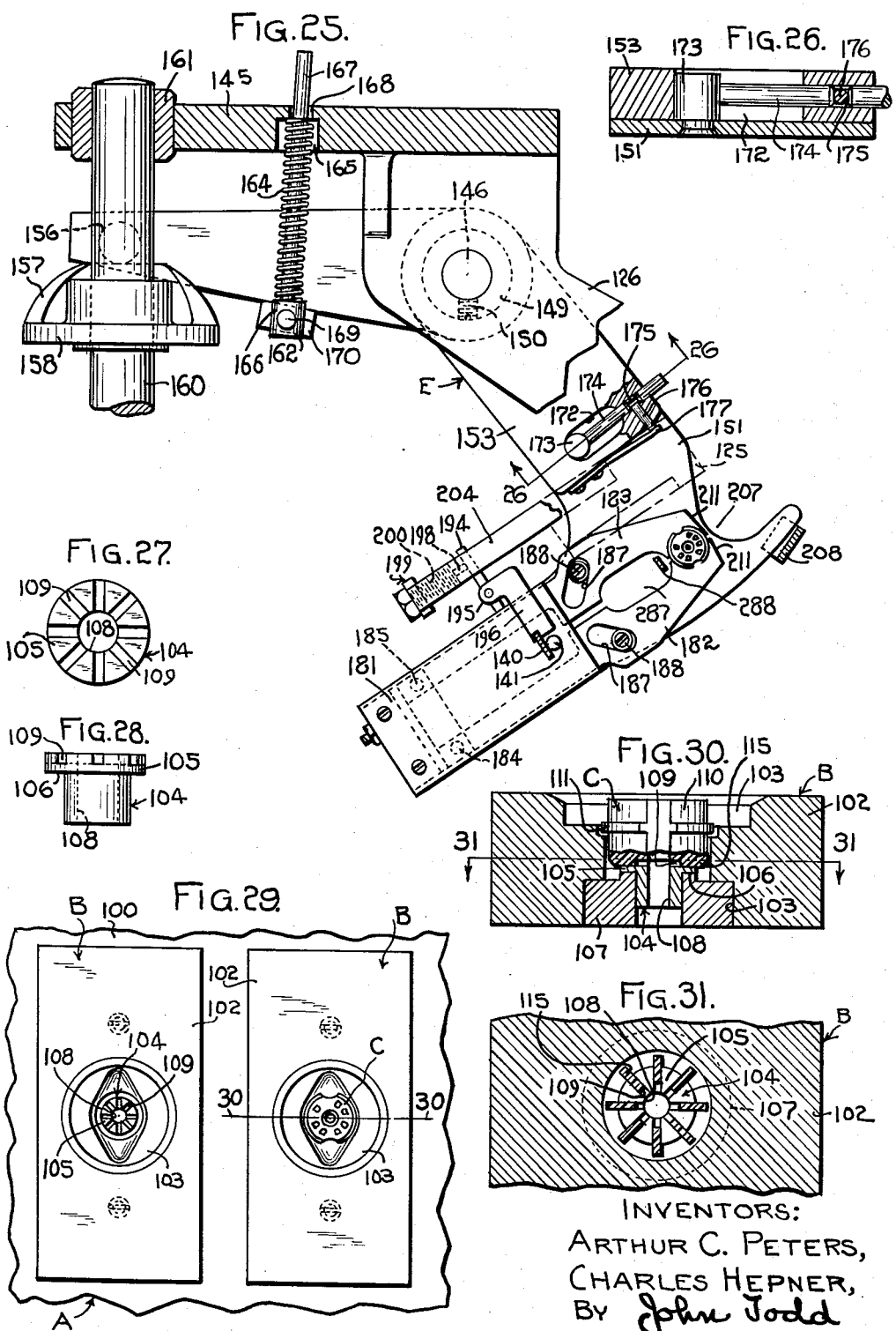
INVENTORS:
ARTHUR C. PETERS,
CHARLES HEPNER,
BY John Todd
ATTORNEY.

Dec. 20, 1960  C. HEPNER ET AL  2,965,247
POSITIONING APPARATUS
Filed July 1, 1955  11 Sheets-Sheet 8
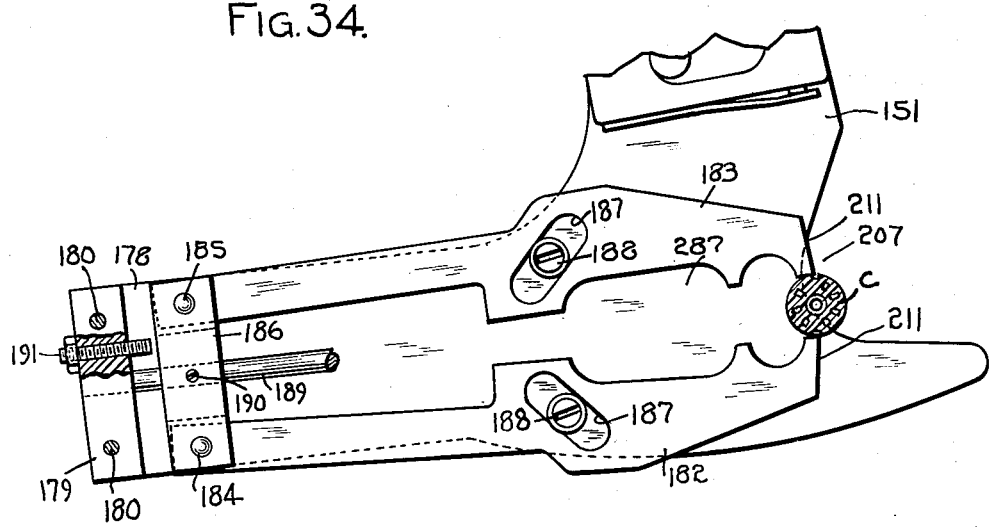
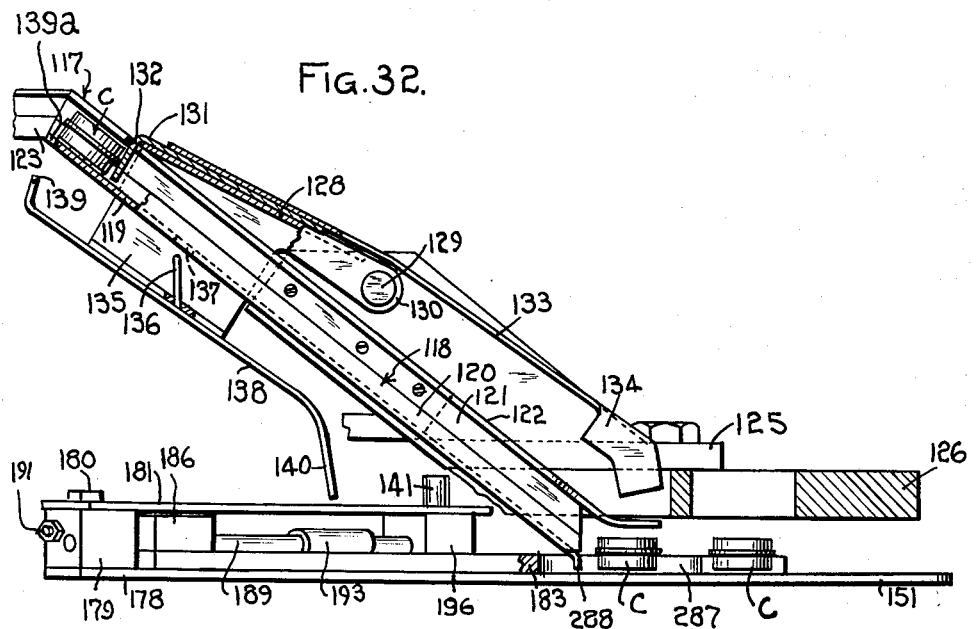
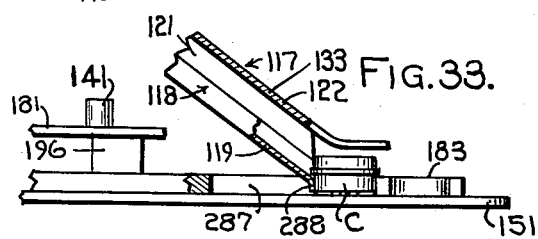
INVENTORS:
ARTHUR C. PETERS,
CHARLES HEPNER,
BY John Todd
ATTORNEY.

Dec. 20, 1960 C. HEPNER ET AL 2,965,247
POSITIONING APPARATUS
Filed July 1, 1955 11 Sheets-Sheet 9
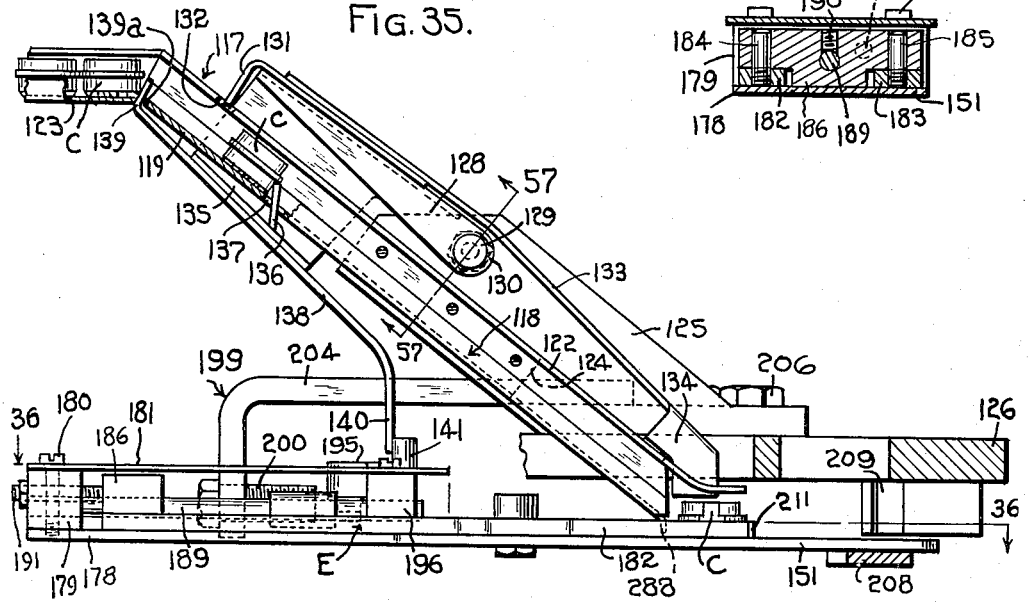
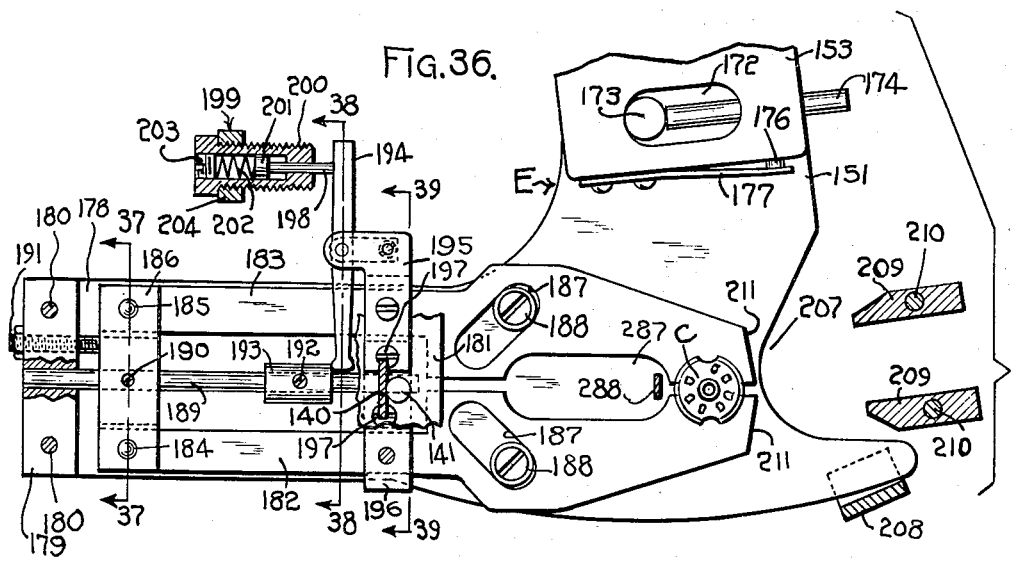
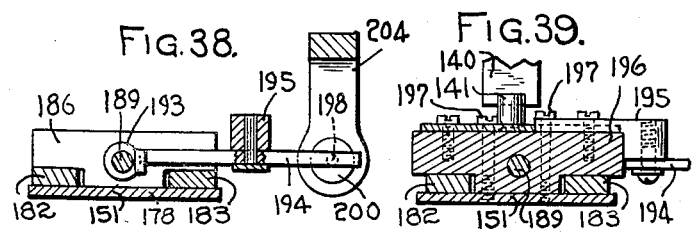
INVENTORS:
ARTHUR C. PETERS,
CHARLES HEPNER,
BY John Jodd
ATTORNEY.

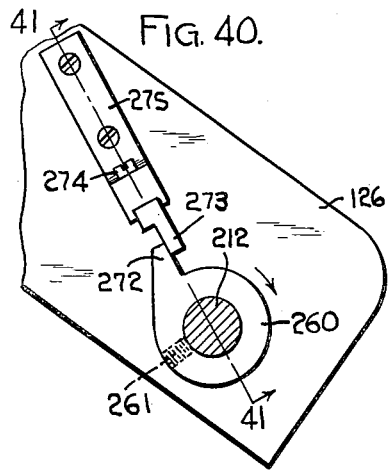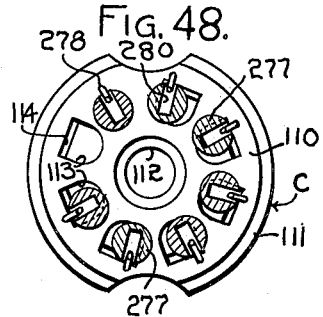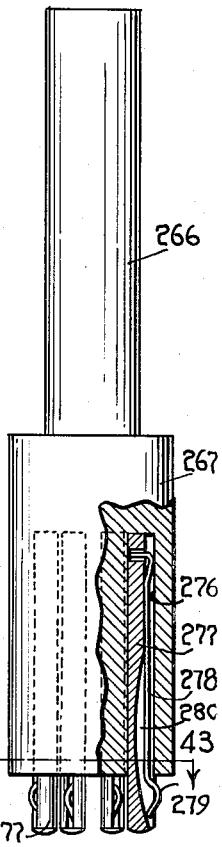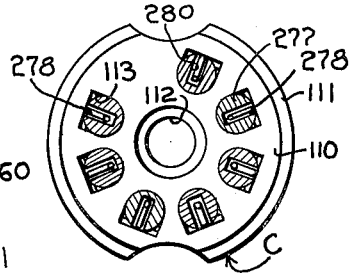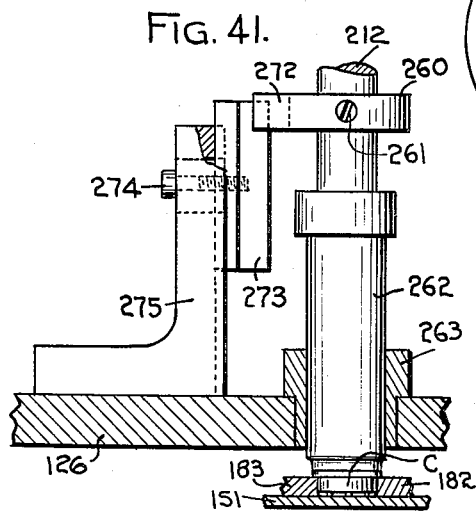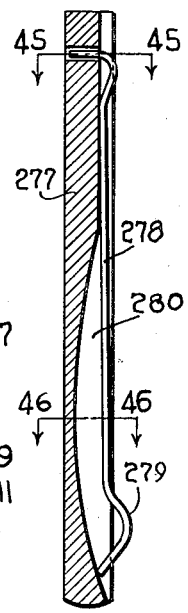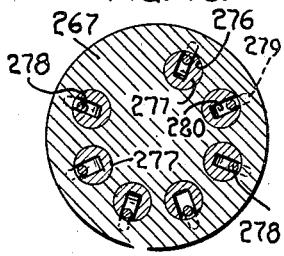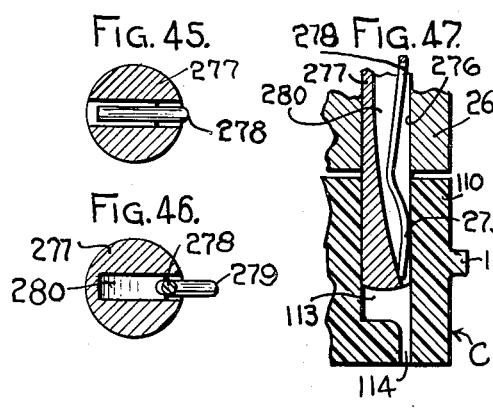

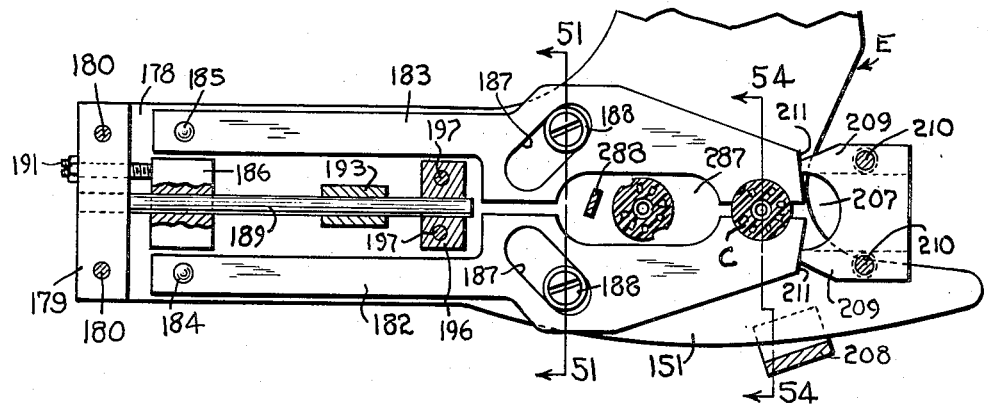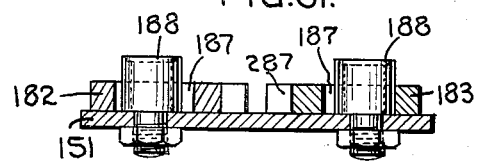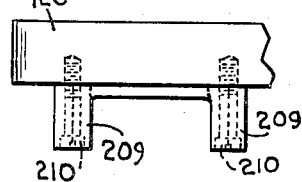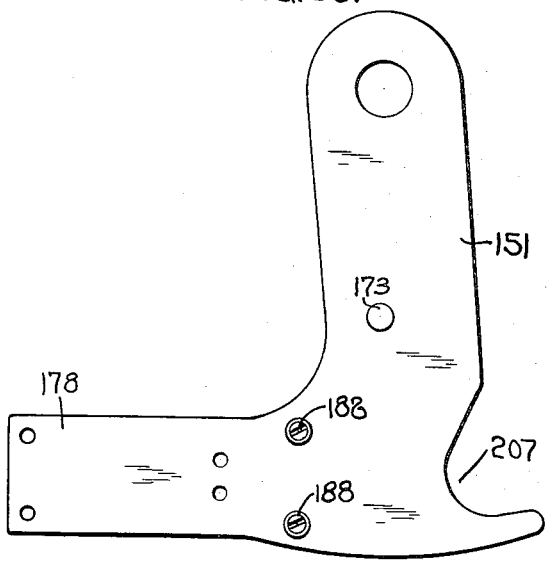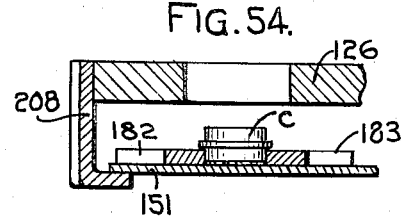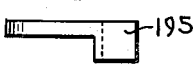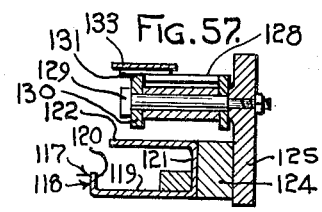

United States Patent Office 2,965,247
Patented Dec. 20, 1960

2,965,247

POSITIONING APPARATUS

Charles Hepner, Chicago, and Arthur C. Peters, Midlothian, Ill., assignors, by direct and mesne assignments, to United-Carr Fastener Corporation, Boston, Mass., a corporation of Delaware Filed July 1, 1955, Ser. No. 519,606

20 Claims. (Cl. 214—1)

This invention relates to apparatus useful in connection with the machine assembly of components that together form a complete article—as, for example, the assembly of a tube socket such as those used in vast numbers in the electronics industry. More particularly, the invention is concerned with the precise alignment of one component of an article so that other components of that article can be machine assembled therewith in a correct, predetermined relationship. As a specific example, the apparatus is useful in positively positioning the apertured terminal castings of a tube socket so that all of the terminal connector pins can be inserted into the apertures by automatic machinery in a subsequent operation.

There is an increasing trend in industry today toward automation. While automation tends to reduce the number of workers required in assembly lines, all of the functions performed by the replaced worker must be carried out by machinery specially designed to perform such functions. In numerous assembly operations, a component of an article is provided with openings intended to receive other components of the article therein. If the components are to be placed within the openings in machine operations, it is first necessary to positively orient the apertured components in some predetermined relation. In the assembly of tube sockets for example, the terminal casting, which is a block of insulating material having openings or bores extending therethrough, must have terminal pins inserted into each of the openings. The terminal casting may have five or more spaced terminal openings, depending upon the particular vacuum tube that it is to receive, and each of these openings is to have a terminal connector inserted therein. At one time the castings were moved along a conveyor, and each of the individual terminal pins were inserted into the openings in hand operations. In certain socket assembly lines, the individual hand placement of the terminal pins was replaced by the simultaneous insertion of all of the required pins in the openings by machines. However, the castings continued to be positively oriented by workers in preparing the same for the machine insertion of the terminal pins.

It is desirable as a further step toward automation to provide a further machine or apparatus for positively orienting the terminal castings of tube sockets in preparing the same for insertion of the terminal pins, and it is an object of this invention to provide such a machine. Another object of the invention is to provide a machine or apparatus that is operative to positively position one component of an article in preparing the same for the assembly therewith of additional components of the article. Still another object is in the provision of a machine that is useful in assembly line operations, and particularly where assembly is carried on for the most part by automatic machinery, with the intention that the machine, in performing one of the necessary steps in the assembly line operation, will replace workmen heretofore required to perform that operation.

A further object is in providing apparatus for automatically feeding, positively orienting and thereafter placing the castings of tube sockets in carriers so that terminal pins can be placed within the openings of the casting by machine in a subsequent operation. Still another object is in providing in apparatus of the character described, a jaw assembly that is operative to receive tube socket castings from a feeder mechanism, advance the same to a predetermined position while positively aligning the castings with other components of the machine that serve to orient the casting, and particularly the openings therethrough, in a predetermined position in preparation for placement of the castings in a carrier. Still a further object is in providing in such apparatus, a spindle assembly that functions after a casting is positioned by the jaw assembly, to orient the openings of the casting in a predetermined arranged, and to thereafter position the aligned and oriented casting in a carrier that maintains the alignment and orientation so that terminal pins can be inserted into the casting openings by a machine in a subsequent operation.

An additional object of the invention is in providing in a spindle assembly of the character described, pin means insertable into openings in a casting, the pins being equipped with resilient holders operative to anchor the casting in position upon the pin means while the casting is moved into its nested relation within the carrier. Another additional object is in providing a jaw assembly that insures positive positioning of a casting in alignment with a spindle assembly and carrier, through compensating movements of the jaws that are brought about automatically as a part of the normal functioning of the jaw assembly. Additional objects and advantages will appear as the specification proceeds.

An embodiment of the invention is illustrated in the accompanying drawings, in which:

Figure 1 is a broken top plan view showing the apparatus; Figure 2 is a top plan view of a socket casting that the particular apparatus illustrated is designed to handle; Figure 3 is a transverse sectional view of the socket taken along the line 3—3 of Figure 2; Figure 4 is a bottom plan view of the socket; and Figure 5 is a top plan view of the socket shown in position within a carrier.

Figure 6 is a transverse sectional view of the apparatus shown in Figure 1 and which is taken along the line 6—6 of Figure 1; Figure 7 is an enlarged broken vertical sectional view taken generally along the line 7—7 of Figure 6; Figure 8 is a vertical sectional view of a portion of the apparatus as viewed along the line 8—8 of Figure 6; and Figure 9 is a transverse sectional view taken along the line 9—9 of Figure 8.

Figure 10:
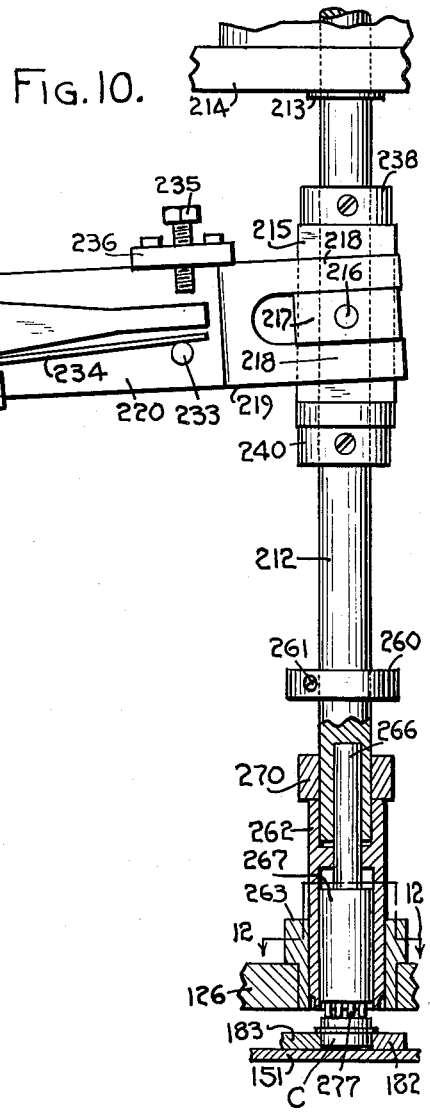
Figure 12:
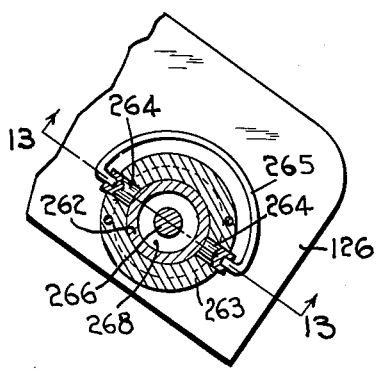
Figure 13:
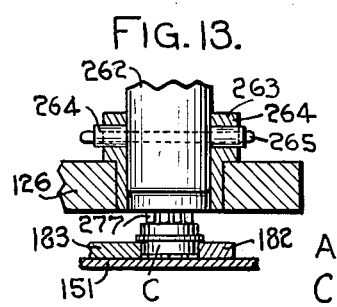

Figure 10 is a side view in elevation, with parts being shown in section, of the spindle assembly; Figure 11 is a side view in elevation of the cam that controls the operation of the spindle assembly; Figure 12 is a transverse sectional view taken along the line 12—12 of Figure 10; and Figure 13 is a sectional view taken along the line 13—13 of Figure 12.

Figure 14 is a side view in elevation of the spindle assembly, and is similar to Figure 10 but shows the assembly in a different position in its operating sequence; Figure 15 is a side view in elevation of the cam for controlling the spindle assembly, and is similar to Figure 11 but shows the cam in the position it assumes when the spindle assembly is in the position shown in Figure 14; Figure 16 is a longitudinal sectional view of the spindle assembly taken along the line 16—16 of Figure 14; and Figure 17 is a vertical sectional view taken along the line 17—17 of Figure 14.

Figure 18 is another side view in elevation of the spindle assembly, and is similar to Figures 10 and 14 but shows still a further position of the assembly; Figure 19 is a side view in elevation of the cam, and it illustrates the position thereof corresponding to the position of the spindle assembly as shown in Figure 18; Figure 20 is a broken vertical sectional view of the lower portion of the spindle assembly, and showing the position thereof when the positioning pins are inserted into the openings in a socket casting; and Figure 21 is a broken vertical sectional view substantially identical to that of Figure 20, but showing the positioning pins withdrawn from the casting.

Figure 22:
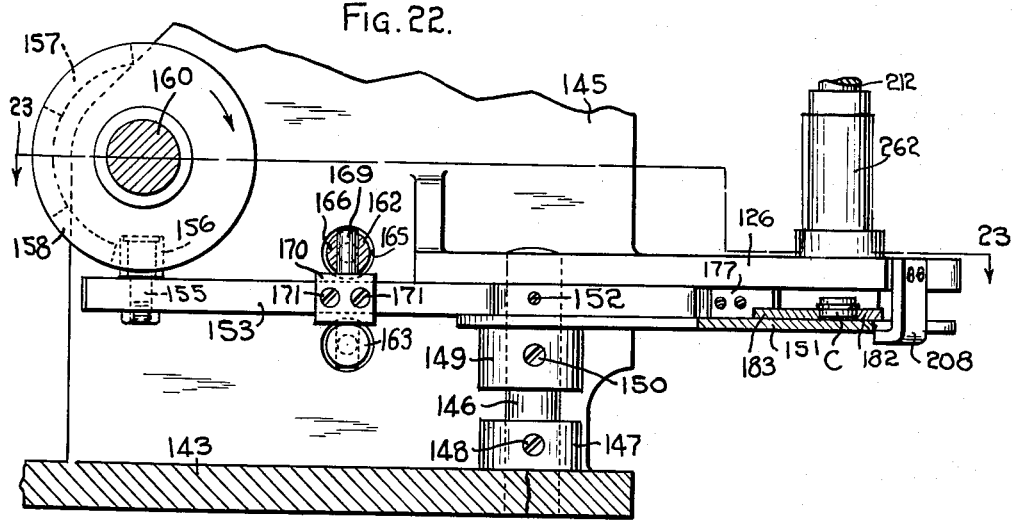
Figure 23:
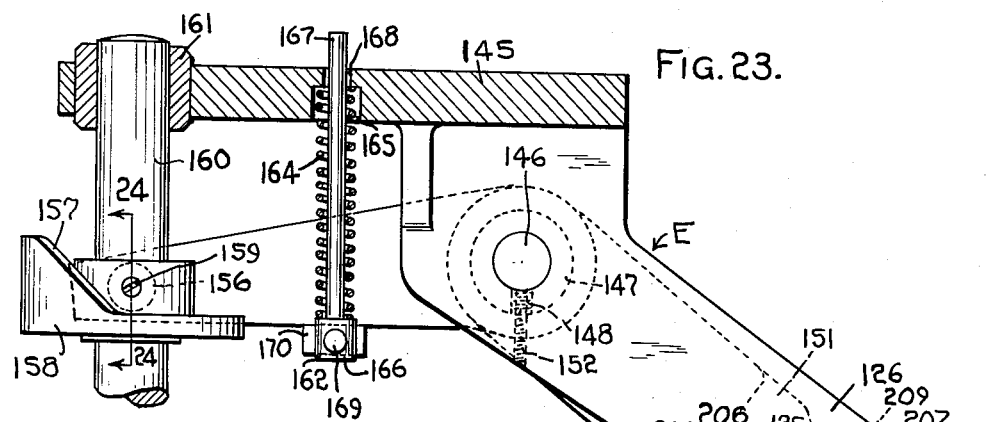
Figure 24:
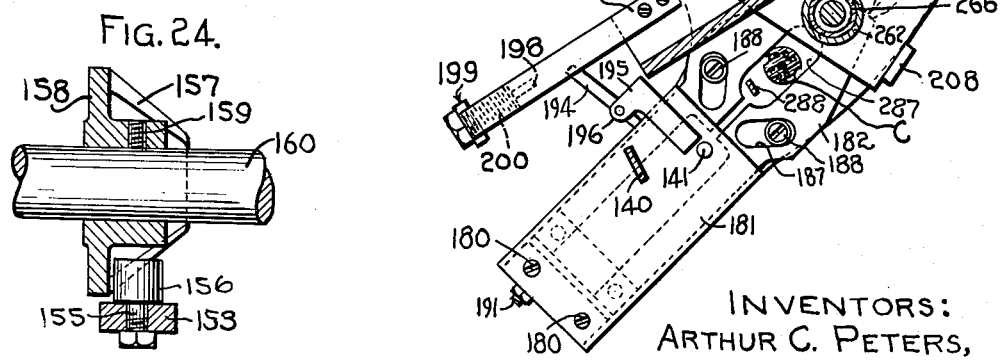

Figure 22 is a longitudinal sectional view of the apparatus taken along the line 22—22 of Figure 1; Figure 23 is a sectional view taken along the line 23—23 of Figure 22; and Figure 24 is a vertical sectional view taken along the line 24—24 of Figure 23.

Figure 25 is a sectional view similar to that of Figure 23, but showing the jaw assembly in a different position in its operative cycle; Figure 26 is a transverse sectional view taken along the line 26—26 of Figure 25; Figure 27 is a top plan view of the insert that holds the casting when it is inserted into a carrier, as shown in Figure 5 for example; Figure 28 is a side view in elevation of the insert; Figure 29 is a broken top plan view of the conveyor showing two of the carriers that are mounted thereon; Figure 30 is a transverse sectional view of one of the carriers taken along the line 30—30 of Figure 29; and Figure 31 is a horizontal sectional view taken along the line 31—31 of Figure 30.

Figure 32 is a side view in elevation of the feeder or raceway, as viewed generally along the arrow designated with the letter A in Figure 1; Figure 33 is a broken longitudinal sectional view of the lower portion of the raceway illustrated in Figure 32; and Figure 34 is a top plan view of the jaws that form a part of the jaw assembly of the apparatus.

Figure 35 is a side view in elevation of the raceway, and is similar to the showing in Figure 32 except that the operating components of the raceway are shown in another position; Figure 36 is a longitudinal sectional view taken along the line 36—36 of Figure 35; Figure 37 is a transverse sectional view taken along the line 37—37 of Figure 36; Figure 38 is a transverse sectional view taken along the line 38—38 of Figure 36; and Figure 39 is a sectional view taken along the line 39—39 of Figure 36.

Figure 40 is a sectional view taken along the line 40—40 of Figure 6; Figure 41 is a sectional view taken along the line 41—41 of Figure 40; Figure 42 is an enlarged side view in elevation of a portion of the spindle apparatus and with parts thereof broken away and shown in section; Figure 43 is a sectional view taken along the line 43—43 of Figure 42; Figure 44 is a greatly enlarged sectional view of one of the positioning pins shown in Figure 42; Figure 45 is a sectional view taken along the line 45—45 of Figure 44; Figure 46 is a sectional view taken along the line 46—46 of Figure 44; Figure 47 is an enlarged broken sectional view showing the positioning pin within the opening in a tube socket casting; Figure 48 is a top plan view of a casting with the positioning pins being shown in section and resting on the top thereof (corresponding to the position of the spindle assembly illustrated in Figure 10); and Figure 49 is a top plan view of a casting with the positioning pins being shown in section and within the openings in the casting and corresponding to the position of the assembly as illustrated in Figure 14.

Figure 50 is a top plan view of the jaw assembly and corresponds to the showing in Figure 36, except that the jaws are in another position; Figure 51 is a sectional view taken along the line 51—51 of Figure 50; Figure 52 is a broken end view in elevation of the stop shown in Figure 50 and being viewed toward the left in that figure; Figure 53 is a top plan view of the lever which comprises a portion of the jaw assembly; Figure 54 is a broken sectional view taken along the line 54—54 of Figure 50; Figure 55 is a side view in elevation of the fulcrum block of the jaw assembly, which is also seen in Figure 36; Figure 56 is an end view in elevation of the fulcrum block; and Figure 57 is a sectional view taken along the line 57—57 of Figure 35.

General description

In describing briefly the major components of the apparatus, reference will be made in particular to Figures 1 and 6. The apparatus comprises a conveyor designated with the letter A that has mounted thereon in spaced apart relation a plurality of carriers B adapted to receive therein, for advancing the same from one station to another, terminal or socket castings C. The castings C are fed downwardly toward the carriers B from a raceway or feeder that is designated with the letter D, and into a jaw assembly or positioner E. The jaw assembly E functions to align the castings above the carriers B and below the spindle assembly F. The movements of the spindle and jaw assemblies are controlled and synchronized through a drive arrangement G. In operation of the apparatus, castings are fed downwardly one by one through the feeder or raceway assembly and are received within the movable jaws of the jaw assembly E. The jaw assembly advances the castings to a position in vertical alignment with the spindle assembly F and with the carriers B that have been moved to a position below and in vertical alignment with the spindle assembly. The spindle assembly then functions to rotate the castings so that the pins thereof are oriented in a predetermined relation with respect to the carriers B, and thereafter the spindle assembly carries the aligned and oriented castings downwardly and into positions within the carriers. The conveyor then advances the carriers to a new position along the assembly line where a further machine (not shown) places terminal pins within the openings in the castings.

The conveyor A

Reference may be made to Figures 1 and 6 which show best a conveyor structure that may be employed in conjunction with the machine. The conveyor A, in the specific illustration given, comprises an endless belt 100 that travels longitudinally in the direction of the arrow placed thereon in Figure 1. The endless belt in its movement is supported and guided by the L-shaped channels 101 on each side thereof. Any appropriate endless belt arrangement may be employed, and while a metal mesh belt may be used, it has been found that a belt 100 formed of fabric provides satisfactory results. The belt may be moved in its direction of travel by any conventional means; and most generally an idler roller at one end will be provided, and a driven roller or drum for powering the belt will be provided at the opposite end. The driven drum may be powered by an electric motor, and control means will be used in conjunction with the motor drive for synchronizing movement of the belt in a manner that will be described in detail hereinafter. Since conveyor drive means are old and well known in the art, they have not been illustrated in the drawings and will not be further described.

The carriers B

The carriers B are best seen in Figures 1, 6 and 27 through 31. A plurality of carriers or blocks are supported along the outer surface of the conveyor belt 100 in longitudinally spaced relation therealong. Each carrier, as is seen perhaps most clearly in Figure 30, comprises an elongated block of material 102 that extends transversely across the belt 100 and is provided centrally with an opening 103 that extends vertically through the block. The upper end of the opening 103 is enlarged, as is seen in Figure 30, and supported within the opening is an insert 104 having an outwardly extending annular flange 105 that seats upon a shoulder or stop 106 provided by a support platform 107 that is removably received within the opening 103 which is enlarged at its lower end to accommodate that platform.

As is shown most clearly in Figure 27, the insert 104 is arcuate and is provided with a central bore 108 that extends vertically through the center thereof. Extending radially outwardly from the opening 108, and at equally spaced apart intervals about the top of the insert, are a plurality of recesses 109. The recesses 109 cooperate with the castings C as will be described subsequently.

The blocks 102, the inserts 104 and the support platforms 107 are preferably formed of metal, although other materials may be employed, and each block is secured to the belt 100 by appropriate means that prevent longitudinal and lateral shifting of the blocks relative to the conveyor belt. Preferably, cap screws extending through the conveyor belt and threadedly received within the blocks 102 will be employed for securing the blocks in position, and attaching means of this character will also permit the blocks to be readily removed from the conveyor belt when such is necessary. It is noted in Figure 29 that the upper end of the opening or passage 103 is elongated in its enlargement, and this arrangement is provided so that a saddle (not shown) can also be positioned within the carriers along with the castings C, so that automatic machinery at advanced positions along the assembly line can rigidly unite the castings and saddle. The saddle will be employed in securing the completed tube socket in position on the chassis of an electronic device.

The castings C

Tube sockets and the components thereof are well known in the art and, therefore, an elaborate description thereof is unnecessary. The specific positioning apparatus illustrated is intended for use with socket castings, and for that reason socket or terminal castings are illustrated in some detail in Figures 2 through 5 in particular (also see Figures 30 and 31), so as to add to a more clear understanding of the apparatus and its functioning. The castings C comprise a block of insulating material 110 that is generally cylindrical and is provided intermediate the ends thereof with an outwardly extending annular flange 111. Extending centrally through the block of material 110 is a bore 112 adapted to receive a shield (not shown) which comprises a component of the completed tube socket. Spaced apart circumferentially about the block of material 110 and extending vertically therethrough are a plurality of apertures or openings 113 that are adapted to receive terminal pins therein that provide the means for electrically connecting circuit components, etc. to the socket. The openings 113 through the upper ends thereof are adapted to receive tube pins therein.

As is shown most clearly in Figures 3 and 4, the lower ends of the openings 113 are restricted, as at 114, and interposed between the openings and extending radially outwardly from the central bore 112 along the bottom surface of the casting are the ribs 115. The ribs 115 are alignable with the recesses 109 provided in the inserts 104 of the carriers B, and when the castings are in position within the carriers the ribs 115 are received within the aligned recesses 109, as is shown in Figure 31.

The castings, and especially the blocks 110 thereof, are made of plastic or some other material having good electrical insulating properties. When the castings are in position within the carriers B, as is seen in Figures 5 and 30, the bottom wall of the castings rest on the insert flange 105.

The feeder or raceway D

The feeder apparatus is seen most clearly in Figures 1, 32, 33, 35 and 57, and reference will be made to these figures in particular in describing this apparatus.

As is shown in Figure 1, this apparatus includes a receptacle 116 that is adapted to receive a plurality of castings C therein. The container 116 forms no particular part of this invention per se, but it may be said that it is operative to advance a continuous stream or line of castings to the raceway 117, as is shown best in Figure 35.

The raceway 117 comprises a downwardly and forwardly oriented guide 118 having a bottom wall 119, side walls 120 and a top wall 122 (Figure 57). The channel 118 is dimensioned so that castings C can move freely therethrough and from the upper end to the lower end thereof. The castings are fed into the channel from a platform 123 that communicates with the upper end thereof and forms an extension of the mechanism within the container 116.

The guide 118 is rigidly secured to a support 124 that, in turn, is rigidly secured to a plate or support bracket 125 carried by the frame 126 of the apparatus. The support bracket 125, as is shown best in Figure 57, has an arm 128 pivotally mounted thereon by means of the pin 129 and bearing member 130. The arm 128 carries an L-shaped finger 131 that has a downwardly turned end portion that extends into the guide channel through an opening 132 in the top wall 122. The opening 132 is adjacent the upper end of the guide channel. Also carried by the arm 128 and extending downwardly therefrom is an arm or extension member 133 having at its lower end a stop member 134 that is adapted to extend between the spaced legs of the bifurcated lower end of the top wall 122, as is shown in Figure 35. Also carried by the arm 128 is an L-shaped plate 135 that extends downwardly along one side of the guide channel 118 and transversely thereunder. The plate 135 is provided with an upwardly and rearwardly oriented stop finger 136 that is adapted to be inserted through an opening 137 in the bottom wall 119 of the guide channel. Also rigidly secured to the bottom leg of the L-shaped plate 135 is an elongated arm 138 having at its rear end an upwardly turned finger 139 adapted to extend through an opening 139a in the bottom wall of the guide channel adjacent the upper end thereof. At its lower end the arm 138 is turned downwardly to form an abutment member 140. The abutment member is adapted to be engaged by a trigger 141 carried by the jaw assembly E, as is shown in Figure 35.

The raceway 117 is adapted to have the movable components thereof shifted between a position shown in Figure 35—wherein the stop fingers 134, 136 and 139 are extended into the guide channel so as to prevent, respectively, movement of a casting C outwardly from the bottom end of the channel, downwardly and to the bottom end of the guide channel, and inwardly and into the guide channel—to the position shown in Figure 32. In the position illustrated in Figure 32, the stop members or fingers 134, 136 and 139 are withdrawn from the channel 118 while the L-shaped member or stop finger 131 depends into the guide channel. In this condition, the casting is admitted into the guide channel, and the one supported by the finger 136 moves downwardly to the lower end of the guide channel and outwardly therefrom.

The jaw assembly E

The figures of primary importance in the description of the jaw assembly are 1, 6, 22 through 26, 34, 36 through 39, and 50 through 56. Of this group, the particular ones being considered from time to time will be enumerated for purposes of clarity.

As is most evident from Figure 6, the apparatus includes a base plate 142 having positioned thereon a bed plate 143. Extending upwardly from the bed plate 143 is a standard 144 and a vertical frame member 145. Extending upwardly from the bed plate 143 is a shaft 146 that is pinned within a boss or collar 147 by a set screw 148. Spaced above the boss 147 is a stop collar 149, also pinned to the shaft 146 by a set screw 150. Mounted for free pivotal movement on the shaft 146 is a cam plate or lever 151. Secured to the shaft 146 by a set screw 152 is a crank arm 153. The shaft 146 is rotatable relative to the bed plate 143, and also with respect to the frame 126 that is carried by the vertical frame member 145. Therefore, swinging movement of the crank arm 153 will rotate the shaft 146, while the lever or cam plate 151 is free to pivot relative to both.

At its lower end the crank 153 rotatably supports on a stud 155 a roller or cam follower 156 that is adapted to ride along the cam surface 157 of a cam 158, secured against rotary movement by a set screw 159 on a driven shaft 160 rotatably supported in a bearing 161 and within the vertical frame member 145. Rotation of the cam 158 is effective to pivot the crank 153 about the vertical axis of the shaft 146.

The crank arm 153 is normally biased so that the cam follower 156 firmly engages and rides on the cam surface 157. The biasing means comprises a pair of spring assemblies 162 and 163, as is shown best in Figure 22. The spring assemblies are identical and a detailed construction of one is illustrated clearly in Figure 23, and it is there seen that the assembly 162 comprises an elongated coil spring 164 that seats at one end within a recess provided within the frame member 145, and at its other end seats against a seat member 166 that is carried by a pin 167 that extends coaxially through the center of the spring 164 and through an opening 168 through the frame member 145, and that communicates with the recess 165. The seat member 166 rotatably receives a vertical pin 169 that extends therethrough and that also extends through a bracket 170 that is anchored to the arm 153 by screws 171.

The crank arm 153 angles outwardly and forwardly at the end thereof opposite the cam follower 156, as is shown most clearly in Figure 25. The lever 151 angles outwardly and forwardly from the shaft 146 in the same general direction as does that end of the crank arm, and lies under the same. It is desired to pivot the lever 151 about the shaft 146 upon swinging movement of the crank arm 153 as such movement is controlled by the cam 158. For reasons to be brought out hereinafter, however, it is also desired to permit release of the lever 151 so as to permit the crank arm to pivot free thereof in the event that free pivotal movement of the lever should be inhibited. A safety release arrangement is provided for accomplishing this result, and it is shown in Figures 25, 26 and 36.

The arrangement provided includes an elongated recess 172 extending through the crank arm 153, and a stop pin or shaft 173 that is rigidly secured to the lever 151 and is freely movable longitudinally through the recess 172. Carried by the pin 173, and extending laterally therefrom through the recess 172 and outwardly through an appropriate opening in the crank arm 153, is a pin 174 having a restricted intermediate portion 175. The pin 174 is free to move relative to the crank arm 153. Slidably received within an opening in the crank arm 153, and extending substantially normal to the longitudinal axis of the pin 174, is a lock pin 176 aligned with the neck 175 and adapted to engage the same under the biasing influence of a flat spring 177 which is carried by the crank arm 153. The pin 176 (Fig. 25) normally rides within the neck 175 of the pin 174, and prevents movement thereof relative to the crank arm 153. Therefore, movement of the crank arm 153, which carries the pin 174 therewith, causes movement of the lever 151 because of the connection therewith provided by the stop pin 173 and pin 174. If, for some reason, movement of the lever 151 is inhibited, the lock pin 176 thereof will be forced outwardly against the biasing action of the spring 177, and then the crank arm 153 will be free to move relative to the pin 174.

By referring to Figure 53, it is seen that the lever 151 is generally L-shaped, and the base leg 178 thereof extends rearwardly and outwardly. At the rear end of the leg 178, as is shown best in Figures 35 and 36, a spacer block 179 is carried along the outer surface of the leg and is secured thereto by cap screws 180. The cap screws also serve to secure a cover plate 181 to the spacer 179, and the cover plate extends forwardly and in spaced relation above the leg 178. Carried for free movement along the upper surface of the base leg 178 are a pair of jaw members 182 and 183. At their rear ends, the jaw members are pivotally mounted respectively on vertical pivot posts 184 and 185 that are carried by a slide block 186. Intermediate the ends of the jaws, each is provided with an angularly oriented cam slot 187 that slidably receives therein the vertical cam posts 188 carried by and extending upwardly from the leg 178 of the lever member 151. The forward ends of jaws are free to open and close upon axial movement of the jaw members relative to the lever 151, with the pivot pins 184 and 185 serving as the pivotal axes for the jaw members. The coaction between the cam slots 187 and cam posts 188 serves to open and close the jaws as the jaws are moved respectively forwardly and rearwardly relative to the lever 151.

A rod 189 extends longitudinally between the jaw members 182 and 183 and through the member 186, and is locked against movement with respect thereto by a set screw 190. The rod 189 at its rear end slidably extends through a bore aligned therewith in the spacer member 179. Rearward movement of the jaw members and slide block 186 is limited by a stop pin 191 threadedly and adjustably received within and extending through the spacer 179. Intermediate its ends the rod 189 has locked thereon, by means of a set screw 192, a sleeve 193 that serves as an abutment member for a fulcrum 194 that is pivotally supported intermediate its ends on a fulcrum block 195 attached to a support block 196, that in turn is secured to the lever 151 by cap screws 197, as is seen most clearly in Figure 39. The rod 189 is slidably received within an opening aligned therewith in the support block 196.

As the lever 151 moves rearwardly, the fulcrum 194 is moved into engagement with the plunger 198 of a stop assembly 199. The assembly 199 includes an exteriorly threaded adjustment member 200 having a chamber therein that slidably receives the piston head 201 of the plunger 198. The plunger is forwardly biased or toward the fulcrum 194 by a coil spring 202 that seats at one end against the head 201, and at its other end against a plug 203 threadedly received within the rear end of the chamber. The member 200 is threadedly received within a threaded opening in a support 204 that extends downwardly and forwardly and is secured to a support bracket 125 fixed by cap screws 206 to the frame member 126 (Figure 23).

As is shown most clearly in Figures 35 and 39, the trigger 141 is fixed to the cover 181 of the jaw assembly, and upon rearward movement of the jaw assembly, engages the depending forward end of the stop finger arm 138 to synchronize movement of castings C through the raceway with movement of the jaw assembly.

Figures 34, 36 and 53 illustrate most clearly that the lever 151 adjacent the clamp ends of the jaws 182 and 183 is recessed inwardly to provide a generally arcuate opening or open area 207. After the jaw assembly has been positioned as shown in Figures 23 and 50, rearward movement of the lever 151 relative to the jaw members positions the opening 207 beneath the clamp ends of the jaws and a casting clamped therein (as is shown partially in Figure 34, although in that figure the jaws have also been moved rearwardly slightly and have partially released the casting) may be moved downwardly then, after its release by the jaws, and into a carrier.

Pivotal movement of the lever 151 about the shaft 146 is guided by the L-shaped support 208 that is secured to the frame member 126 and extends downwardly therefrom and under the lever 151. In general alignment with the opening 207 and spaced forwardly therefrom are a pair of spaced apart jaw members or stops 209 that, as is seen in Figure 52, are rigidly secured by means of recessed cap screws 210 to the frame member 126. The stop members 209, as is shown in Figure 50, are aligned with the respective forward ends of the jaws 182 and 183 and are adapted to firmly engage the same upon forward movement of the lever 151. The forward edges of the jaw members, as is shown at 211, are inclined inwardly and forwardly so that in effect a camming action is provided upon engagement of those ends with the stops 209. This camming function causes the jaws to move inwardly at their forward ends so as to tightly grip the casting C positioned therebetween.

The jaw members 182 and 183 lie loosely on the lever 151 and when the lever 151 is swung rearwardly, from the position shown in Figure 50 wherein the jaw members are abutting the stops 209, and are firmly gripping the casting positioned therebetween, if the casting is held stationary the jaws will be cammed open because of relative movement between the cam pins 188 and cam slots 187, as is illustrated in Figure 34, to open the jaws and permit them to be moved rearwardly with respect to the stationary casting and along with the lever 151. While the jaws are open and are being moved rearwardly, they are conditioned to accept therebetween another casting that has been discharged downwardly and onto the lever 151 from the raceway. Continued rearward movement of the lever 151 will bring the fulcrum 194 into engagement with the stop plunger 198; and as the fulcrum pivots about the fulcrum block 195, the rod 189 will be pushed rearwardly so as to move the jaw members rearwardly with respect to the lever 151. This will cause the jaws to move to closed position because of the coaction between the cam slots 187 and cam pins 188 so as to grip the casting that has been moved therebetween.

The Spindle Assembly F

The function of the spindle assembly is twofold. First, that of orienting the castings C, and thereafter advancing the same into predetermined positions within the carriers B. In the description of the spindle assembly that is to follow, reference will be made in particular to Figures 6 through 21 and 40 through 47.

The spindle assembly includes an elongated spindle shaft 212 that is rotatably supported adjacent its upper end in a bearing 213 that is provided within a horizontal support platform 214. Intermediate its ends the shaft 212, as is shown in Figure 16, is rotatably supported in a block 215 that is rotatably carried by pins 216 that extend through guides 217 positioned adjacent each side of the block 215, and that are received respectively between the spaced bifurcated legs 218 of a yoke 219 that forms an extension of a pivot arm 220 pivotally supported upon a shaft 221 that extends laterally outwardly from the frame member 145. Also pivotally mounted on the shaft 221 is a bell crank 222 that at its lower end carries a roller or cam follower 223 mounted for rotational movement upon a bearing pin 224. The cam follower 223 is adapted to ride on the cam surface 225 of a cam 226 that, as is shown in Figure 1, has an integral collar or hub 227 that is locked upon the shaft 160 by the set screw 228. It will be noted in Figure 1 that the shaft 160, as has been brought out hereinbefore, also provides the mounting for the cam 158 that controls movement of the jaw assembly.

The bell crank 222 forwardly of the pivot shaft 221 has a spring seat 229 secured thereto by cap screws 230. An elongated spring member 231 secured to seat 229 extends downwardly therefrom and at its lower end is secured to a bracket 232 provided by the frame member 126. The spring 231 functions to bias the forward end of the bell crank 222 downwardly so as to cause tight engagement of the cam follower 223 with the cam surface 225.

Since the bell crank 222 and the pivot arm 220 move independently of each other, and it is desired to move the arm 220 along with the bell crank 222 while also providing some limited movement of the arm 220 relative to the bell crank, the following structural connection between these two members is provided, which is a useful safety device if a casting is stuck in the carrier B and is fed through again unnoticed by the operator and comes under the spindle—the arm 220 can yield. The arm 220 is equipped with a pin 233 that extends outwardly therefrom and that has bearing thereagainst a flat or leaf spring 234 secured between the spring seat 229 and bell crank 222. The leaf spring 234 is operative to bias the arm downwardly relative to the bell crank. At the same time, however, the arm 220 may be moved upwardly, as seen in Figure 14, against the biasing action of the spring. Positive movement of the arm 220 is effectuated by upward movement of the forward end of the bell crank 222 by engagement of that end with a stop screw 235 that is threadedly received within and extends through a plate 236 rigidly secured to the arm 220 by screws 237.

Vertical movement of the spindle shaft 212 is caused by up and down swinging movement of the arm 220 because the bearing block 215 which is carried by the arm 220 abuts at its upper end a stop collar 238 locked on the shaft 212 by set screw 239, and abuts at its lower end the stop collar 240 pinned to the shaft 212 by a set screw 241.

The shaft 212 is rotated by a motor (not shown) having a drive shaft 243 equipped at its lower end with a drive pulley 244. Entrained about the drive pulley 244 is a pulley belt 245 that is also entrained about a driven sheave or pulley wheel 246 that is rotatably mounted upon a bearing 247 carried by a clutch sleeve 248. It is desired to operate the motor continuously, but to drive the shaft 212 intermittently, and a friction clutch is provided to accomplish that result. The clutch is shown in detail in Figure 8.

The clutch includes, in addition to the pulley wheel 246 and clutch sleeve 248, a collar 249 that has a key 250 extending therethrough and into a splineway 251 provided about the exterior surface of the sleeve 248. Thus, the collar 249 is prevented from rotating relative to the sleeve 248, but may move longitudinally thereon. A coil spring 252 seats at its lower end against the upper surface of the collar 249 and pushes it downwardly against the pulley wheel 246. At its upper end the spring 252 bears upwardly against the collar 253 that is locked against rotary and longitudinal movement on the sleeve 248 by a set screw 254 (Figure 9). The collar 253 holds a pair of keys 255 extending through openings in the sleeve 248 so that the inner ends thereof ride within splineways 256 with which the upper end of the shaft 212 is provided. At its lower end the sleeve 248 seats upon the upper end of the bearing 213 and is flared outwardly to provide a flange 257 that extends under the lateral legs of limit members 258 that are carried by the frame member 214 and are secured thereto by cap screws 259.

It is apparent that as the pulley 246 is rotated, the frictional engagement between it and the collar 249 (that is provided by the biasing action of the spring 252), and the spring couple between the collars 249 and 253, will tend to cause rotation of the sleeve 248, which in turn will rotate the shaft 212. On the other hand, if rotation of the shaft 212 is stopped, the frictional engagement between the pulley 246 and collar 249 that is provided by the spring 252 will be overcome, and the pulley 246 may continue to rotate while the shaft and clutch sleeve 248 remain stationary.

Referring now to Figures 18, 20 and 21 in particular, it is seen that the spindle shaft 212 has a collar 260 pinned thereto by a set screw 261 to prevent longitudinal movement of the collar upon the shaft. Slidably mounted upon the shaft 212 below the collar 260 is a stripper sleeve 262 that is slidably received in bearing 263 carried by frame member 126. For reasons that will be brought out hereinafter, it is desired to retard upward movement of the stripper sleeve 262 when the shaft 212 is moved upwardly by the bell crank 222, and for that reason friction pins 264 extend through the bearing 263 at opposite sides thereof and are spring biased by a spring bail 265 against the sleeve 262.

As is shown most clearly in Figures 20 and 21, the spindle shaft 212 has a bore extending longitudinally therein at its lower end, and received within that bore is the neck 266 of a spindle 267. The stripper sleeve 262 is provided with a continuous bore 268 extending therethrough that is alternately enlarged and restricted so that the spindle and its neck may move freely in axial directions relative to the stripper sleeve. The spindle, and especially the neck thereof, is locked to the shaft 212 by means of a set screw 269 that prevents relative rotational movement between the spindle and shaft. An abutment collar 270 is locked on the shaft 212 by set screw 271 and encloses the lock screw 269.

At certain times it is desired to abruptly terminate rotation of the shaft 212 and spindle 267, and such times are when the spindle apparatus (in a manner to be described hereinafter) has oriented a casting C so that it may be advanced into a carrier B and be properly positioned for subsequent assembly operations. Termination of the rotary movement of the shaft 212 is accomplished through engagement of an ear 272, with which the collar 260 is equipped and which extends laterally outwardly therefrom with a stop 273 rigidly secured by a screw 274 to an L-shaped standard 275 that in turn is secured to a frame member 126. In certain positions of the shaft 212, the ear 272 is above the upper limits of the stop 273 so that rotary movement of the shaft 212 is not inhibited. However, upon downward movement of the shaft, the ear 272 comes into alignment with the stop 273, and in the rotary movement of the shaft 212 eventually strikes the stop member.

Referring now especially to Figures 42 through 49, it is seen that the spindle 267 is provided with a plurality of circumferentially spaced-apart bores 276 extending axially therein. Received within each of the bores 276 is a positioning pin 277 that has a lower end portion that extends below the lower limits of the spindle 267. The pins 277 are held in place within the bores 276 by spring members 278 that at their lower ends have an outwardly bowed portion 279 that projects beyond the peripheral surface of the pin. The springs 278 are received within an axially extending contoured slot 280 with which each of the pins is provided. As is shown in Figure 47, the depending end portions of the pins 277 are adapted to enter the openings or apertures 113 in the castings C, and the bowed portions 279 upon such entry of the pins resiliently engage the walls of the openings 113.

*The Drive Arrangement G*

Referring now to Figures 1 and 6, it is seen that the drive shaft 160 as well as being journaled at one end within a bearing 161 (Figure 23) is journaled at its opposite end in a bearing 281 provided by a standard 282 that extends upwardly from and is rigidly secured to plate 143. Locked on the shaft 160 is a sprocket 283 having entrained thereabout a sprocket chain 284 that at its upper end is entrained about a drive sprocket 285 mounted on a shaft 286 that is driven by a motor (not shown). Upon energization of the motor, the shaft 160 is rotated, and the rotational movement thereof drives the jaw assembly cam 158 and the spindle assembly 226. It will be apparent that the drive means for the conveyor belt 100 must be synchronized with the movements of the jaw assembly and spindle assembly, and control means to provide such synchronization will be provided. Such arrangements are well known in the art, and the details thereof will not be described and for simplicity, are not illustrated in the drawings.

*Operation*

In operation of the apparatus, the container 116 or other magazine device employed for advancing castings C to the raceway 117 is filled with castings. The motor is energized for driving the spindle assembly, and the drive means for the conveyor and for the shaft 160 are both energized. The conveyor belt 100 then advances carriers B successively in step by step fashion beneath the spindle 267, as is shown in Figures 6 and 7 for example. Movement of the conveyor belt 100 is interrupted after a carrier has been vertically aligned with the spindle and until the casting has been oriented and moved downwardly and into the carrier. The conveyor belt is then again energized to move a successive carrier beneath the spindle.

As a carrier is positioned beneath the spindle, the shaft 160 is rotating the cam 158 to drive the cam follower 156 toward the frame 145, as viewed in Figure 23, thereby swinging the member 153 inwardly against the biasing action of the spring 164. At this time the pins 277 have been set in a casting C holding it against movement. Through the safety pin couple, illustrated in detail in Figures 25, 26 and 36, the lever 151 is swung rearwardly. The casting being held stationary will cause the jaws 182 and 183 to open. The reason for this is that the arm 151 is moving toward the left and carries the studs 188 with it, as they are fastened to it (see Fig. 51). The jaws 182 and 183 are held by the casting. The studs 188 act on the slots 187 to open the jaws (see Fig. 34). After the jaws have left the casting C the lever 151 is still moving to the left, then contact is made with the lever 194 and the spring 202 closes the jaws 182 and 183 around a casting that has just been fed into position (see Fig. 25), and holds it in position to be fed forward.

While the jaws are open (as seen in Figure 34) and are moving rearwardly, a casting, which has been discharged from the lower end of the raceway track and into the space 287 between the jaws (as shown in Figures 32 and 50), is received between the forward ends of the jaws. The casting is prevented from moving rearwardly through engagement thereof with the depending stop 288 of the raceway, as is shown most clearly in Figure 33.

As the jaw assembly continues to move rearwardly, the lever 194 engages the stop plunger 198 and is pivoted into engagement with the abutment member 193 to move the jaw members 182 and 183 rearwardly along with the rearward movement of the lever 151. When the lever moves forwardly, the spring 202 and lever continue to urge the jaws rearwardly and the jaws are caused to close about the casting positioned therebetween because of the camming action between the angular cam slots 187 and the cam pins 188. At this time the jaws are in the condition illustrated in Figures 25 and 36 and have a casting gripped therebetween.

Following this, the cam 158 rotates and the cam follower 156 rides downwardly on the cam surface while the spring 164 pushes the arm 153 outwardly (as is shown in Figure 23), with the result that the lever 151 moves forwardly and, through engagement of the member 186 with the stop pin 191, the jaws 182 and 183 are also moved forwardly, and in that forward movement ultimately abut the cam stops 209 (as is seen in Figures 23 and 50). The camming action that occurs between the inclined or cam jaws 211 of the jaws and the stop members 209, in cooperation with the camming action that occurs between the inclined slots 187 and cam rollers 188, causes the jaws to move inwardly at their forward ends so as to tightly grip the casting positioned therebetween. Further, the camming action between the stops 209 and cam edges 211 effectuates an automatic centering of the jaws 182 and 183 so that the casting gripped thereby is automatically aligned vertically with the spindle 267 and the insert 104 of a carrier B, which at that time is positioned beneath and is in vertical alignment with the spindle.

When the jaw assembly was moved rearwardly, the trigger 141 carried thereby engaged the depending end portion of the finger 136, as is shown in Figure 35, thereby swinging the entire finger assembly about the pivot pin 129 supporting the same. That pivotal movement inserts the fingers 136 and 139 into the raceway channel (as is shown in Figure 35), the lock finger interrupting movement of castings C into the raceway channel, while finger 136 prevents downward movement within the channel of a casting that previously had been admitted into the upper end of the raceway channel, as is shown in Figure 35. The same condition of the finger assembly moves the lower stop finger 134 downwardly, as is also shown in Figure 35, so that while the jaw assembly continues to move rearwardly a casting positioned within the opening 287 and abutting the stop finger 288 remains stationary and is received between the forward ends of the jaw members.

When the jaw assembly moves forwardly so as to release the trigger 141 from engagement with the finger 136, the finger assembly pivots about its support and into the condition illustrated in Figure 32. At this time the upper end of the raceway channel is open for admitting a casting thereinto, but the finger 131 holds the admitted casting in the upper portion of the channel. A prior admitted casting which was held within the channel by the finger 136, as is shown in Figure 35, is permitted to slide downwardly through the raceway channel and is discharged from the lower end thereof because the stop finger 134 has been swung upwardly. That casting, then, moves into the enlarged opening 287 between the jaw members, as shown in Figure 32.

The spindle assembly, and particularly the shaft 212 thereof, is in its uppermost position after the casting has been positioned thereunder and in vertical alignment therewith. Figures 6 and 7 most clearly show the position of the shaft at this time, and in Figure 10 the shaft 212 has been lowered until the pins are rotating on the top of the casting held between the jaws 182 and 183.

The biasing action of the flat spring 234, at the same time, is forcing the arm 220 downwardly and the positioning pins 277 are riding along the upper surface of the casting C, as is shown in Figure 10 and as is shown also in Figure 48. The spindle shaft 212 at this time is rotating.

Ultimately in the rotation of the spindle 267, and at one predetermined rotational position thereof, the positioning pins 277 are about to come into vertical alignment with the apertures or openings 113 in the casting C. When vertical alignment thereof occurs, the biasing force provided by the spring 234 in combination with the weight of the spindle assembly will cause the spindle to move downwardly so that the positioning pins 277 enter the apertures 113 within the casting, as is shown in detail both in Figures 47 and 49, the position of the spindle assembly generally being shown in Figure 14.

Once the positioning pins are within the casting, rotation of the spindle continues, for the casting while being gripped by the jaws 182 and 183 is free to rotate with respect thereto. However, because the spindle shaft 212 has moved downwardly, the ear 272 provided by the collar 260 (see Figure 40) is in horizontal alignment with the spindle stop member 273; and in the rotational movement of the shaft, the ear 272 will engage the stop 273 and terminate rotation of the spindle shaft and spindle. The friction clutch assembly heretofore described, and shown in detail in Figure 8, permits the spindle drive motor to continue its rotation of the drive pulley 244 and pulley wheel 246.

It is clear that the ear 272 and stop 273 cause the spindle to stop rotating so that the casting is at such time oriented in a predetermined relationship with respect to the carrier B. Therefore, irrespective of the initial position of the casting within the jaws, the positioning pins at one rotary position thereof will drop into the casting apertures, and thereafter the casting will be rotated to such predetermined condition of orientation.

The cam 226 in its continued rotation will assume the position shown in Figures 18 and 20. The cam roll 223 is then at the lowest point of the surface 225 (see Figure 19). At this time the casting C has been lowered into position on the carrier B, Figure 20, with ribs 115 in the recesses 109. With continued rotation of the cam 226 the bell crank 222 will swing the arm 220 upward to raise the spindle. Upward movement of the stripper sleeve 262 will be retarded, however, because of the frictional arrangement shown in Figure 21. It is seen in Figure 21 that the spindle has been moved upwardly so as to withdraw the positioning pins 277 from the casting, while the stripper sleeve 262 remains in engagement with the upper surface of the casting so as to hold it within the carrier while the positioning pins are withdrawn therefrom. Ultimately, however, the stripper sleeve will be withdrawn from the opening 103 within the carrier so that the conveyor belt 100 may advance the loaded carrier and position a subsequent one under the spindle.

The stripper sleeve is preferred because (as is shown most clearly in Figure 47) the elongated spring members 278, and especially the lower end portions 279 thereof, bear against the surfaces of the casting that define the apertures 113. Thus, once the positioning pins 277 have been inserted into the apertures, the casting is gripped and is held on those pins because of the resilient engagement therewith of the outwardly bowed end portions 279 of the spring members. The spring member 278 also holds pins 277 in the holder 267. The upper bow of the spring 278 bears against the wall of the opening 276 with a stronger force than the bowed portion 279 does against 113, therefore, the pins 277 will stay in the spindle 267 when the casting is ejected. It is desired to provide gripping of the casting when in position on the pins 277 because the jaw members 182 and 183 are withdrawn from about the casting, leaving it supported wholly by the positioning pins. Thus, the only support for the casting while it is being moved downwardly and into the carrier B is provided by the positioning pins 277.

Thus a complete sequence in the operational cycle of the apparatus has been described, and this sequence of operations is carried on repetitiously as each carrier is moved into position under the spindle so that each casting is positively positioned in vertical alignment with the carrier and spindle, is oriented rotation-wise in a predetermined relationship with respect to the carriers, and is placed within a carrier.

It should be noted that the jaw members are shiftable slightly with respect to each other within the limits afforded by the clearance between the angular cam slots 187 and the cam pins or rollers 188. Thus, the forward cam edges of the jaw members, upon engagement with the stops 209, effectuate an automatic centering or aligning of the jaws and a casting gripped thereby with respect to the lever 151. This action is carried out along with the camming of the jaws to closed position by the same coaction. Thus, the castings are always positively positioned in a predetermined location with respect to the lever 151 and, therefore, with respect to the spindle and carrier thereunder.

The coil spring 202 yieldably urges the fulcrum 194 into engagement with the sleeve 193, so that upon rearward movement of the lever 151 the jaw members tend to remain stationary at least initially because of their clamping position about a casting. The resultant relative movement between the jaw members and the lever causes the jaw members to be cammed open so as to release a casting therein and to accept another casting. The opposite effect results when the lever 151 moves forwardly. The resiliency of the spring 202 at that time tends to retard forward movement of the jaw members so that resultant relative movement between the lever and jaw members cams the jaws to closed position.

The safety drive-release coupling shown in Figures 25, 26 and 36 normally functions to provide a driving connection between the crank arm 153 and the lever 151. However, if the jaw assembly should become jammed and free movement of the lever 151 inhibited, the biasing action of the spring 177 is overcome whereby the release pin 176 moves outwardly and the pin 174 is free to shift axially with respect to the crank arm. Thus, the lever 151 may remain stationary, the shaft 173 simply remaining stationary within the slot 172 as the crank arm is pivoted.

In the foregoing specification, the various features of the invention have been described in considerable detail, and have been shown in the drawings in detail, for purposes of making a complete disclosure of an illustrative embodiment of the invention. It will be clear to those skilled in the art that the invention is susceptible to other embodiments and that the details of the various features of the invention may be altered considerably without departing from the spirit and principles of the invention.

We claim:

1. In orienting apparatus of the character described, an elongated shaft supported for movement along the longitudinal axis thereof, means for moving said shaft along that axis, said shaft being equipped with a spindle extending outwardly therefrom along its longitudinal axis, a plurality of spaced apart positioning pins provided by said spindle and being adapted to enter apertures in an article aligned therewith, a stripper carried by said shaft and being adapted to abut an article receiving said pins therein, and means for retarding movement of said stripper upon movement of said shaft and spindle in a direction away from an article receiving said pins to strip that article from the pins.

2. In a spindle adapted for use in rotationally orienting an article having a plurality of openings therein, a head provided by said spindle and having a plurality of spaced apart axially extending bores therein, a positioning pin removably mounted in each of said bores and extending outwardly therefrom, and spring means for each pin frictionally engaging the same and the wall of the bore therefor for holding said pins within the respective bores.

3. In a spindle assembly equipped with a plurality of positioning pins adapted to respectively align with and enter openings provided within an article, an elongated shaft carrying said pins at one end thereof, means for rotating said shaft, a stop ear carried by said shaft and extending laterally therefrom, a stop provided adjacent said shaft and being adapted to be engaged by said ear to prevent rotation of said shaft, and means for supporting said shaft for movement along the longitudinal axis thereof, said ear and stop being arranged so that said shaft normally rotates freely in one longitudinal position thereof but when moved longitudinally to another position upon said pins entering openings in an article, said ear is aligned with the stop and terminates rotational movement of the shaft upon abutment of the ear with the stop.

4. In a spindle assembly adapted for use in rotationally orienting an article provided with a plurality of openings therein, an elongated, vertical spindle shaft mounted for rotational movement, a clutch arranged with said shaft for rotating the same, means for rotating said shaft through said clutch, means for supporting said shaft for vertical movement, a spindle carried by said shaft and having a plurality of positioning pins depending therefrom and being adapted to ride on the surface of such an article positioned thereunder, a stop ear carried by said shaft and extending laterally therefrom, a stop member adjacent said shaft, said stop ear being positioned above said stop when said pins are riding on the surface of such an article and being aligned with said stop when said shaft moves downwardly upon entry of said pins into the openings of the article.

5. The apparatus of claim 4 in which said pins are equipped with spring members frictionally engageable with an article receiving said pins therein, and in which said shaft is equipped with a stripper engageable with an article receiving said pins therein to constrain the article upon longitudinal movement of the shaft to strip the article from said pins.

6. In orienting apparatus of the character described, an elongated shaft supported for movement along the longitudinal axis thereof, means for moving said shaft along that axis, said shaft being equipped with a spindle extending outwardly therefrom along its longitudinal axis, a plurality of spaced apart positioning pins provided by said spindle and being adapted to enter apertures in an article aligned therewith, a stripper carried by said shaft and being adapted to abut an article receiving said pins therein, means for retarding movement of said stripper upon movement of said shaft and spindle in a direction away from an article receiving said pins to strip that article from the pins, said stripper comprising a sleeve slidably mounted upon said shaft, said last mentioned means comprising a collar slidably receiving said stripper sleeve therein, and friction means operative between said collar and sleeve to retard movement of the sleeve within said collar.

7. In orienting apparatus of the character described, an elongated shaft supported for reciprocatory movement along the longitudinal axis thereof and for rotational movement thereabout and being equipped with a spindle at an end thereof, means for reciprocating said shaft, means for rotating said shaft, pin means provided by said spindle for entry into apertures in an article aligned therewith, a stripper sleeve carried by said shaft for reciprocable movement therewith but being relatively movable with respect thereto through a predetermined distance, said stripper being characterized by abutment thereof with an article aligned with said spindle and receiving said pin means therein, and means for retarding movement of said stripper through said predetermined distance upon movement of said shaft and spindle to strip such article from said pin means when the shaft and spindle are displaced therefrom, said last mentioned means comprising a collar slidably receiving said stripper sleeve therein and friction means operative between said collar and stripper to retard movement of the stripper with respect to said shaft through said predetermined distance.

8. In orienting apparatus of the character described, an elongated shaft supported for reciprocatory movement along the longitudinal axis thereof and for rotational movement thereabout and being equipped with a spindle at an end thereof, means for reciprocating said shaft, means for rotating said shaft, pin means provided by said spindle for entry into apertures in an article aligned therewith, a stripper sleeve carried by said shaft for reciprocable movement therewith but being relatively movable with respect thereto through a predetermined distance, said stripper being characterized by abutment thereof with an article aligned with said spindle and receiving said pin means therein, and friction means bearing against said stripper to retard movement thereof through said predetermined distance upon movement of said shaft and spindle to strip such article from said pin means when the shaft and spindle are displaced therefrom.

9. In orienting apparatus of the character described, a shaft supported for reciprocable movement along the longitudinal axis thereof and equipped with pin means for insertion into an article aligned therewith, a stripper sleeve carried by said shaft for relative movement along the longitudinal axis thereof, spaced stop means provided by said shaft for limiting the relative movement of said stripper sleeve therealong, and friction means in engagement with said stripper sleeve for resisting movement thereof, said stripper sleeve being adapted to abut an article receiving said pin means therein to constrain movement thereof when said shaft is displaced therefrom and thereby strip such article from said pin means, said spaced stop means being oriented to afford relative movement between said shaft and stripper sleeve through a predetermined distance when the stripper sleeve is in abutment with such article.

10. The orienting apparatus of claim 9 in which said friction means comprises a collar slidably receiving said stripper sleeve therein and resilient means operative between said collar and stripper sleeve.

11. The structure of claim 10 in which said resilient means comprises friction pins slidable through said collar and into engagement with said shaft and spring means urging said friction pins into such engagement.

12. In orienting apparatus of the character described, a shaft supported for reciprocable movement along the longitudinal axis thereof and equipped with pin means for insertion into an article aligned therewith, a stripper sleeve carried by said shaft for relative movement along the longitudinal axis thereof, said shaft having a restricted cross section of predetermined length intermediate the ends thereof, said stripper sleeve having portions extending into said restricted cross sectional area of the shaft whereby the extent of the relative movement between the stripper sleeve and shaft is defined by the length of said restricted cross sectional area, and friction means in engagement with said stripper sleeve for resisting movement thereof, said stripper sleeve being adapted to abut an article receiving said pin means therein to constrain movement thereof when said shaft is displaced therefrom and thereby strip such article from said pin means, said restricted cross section being oriented to afford relative movement between said shaft and stripper sleeve through a predetermined distance when the stripper sleeve is in abutment with such article.

13. In a spindle assembly adapted to rotationally orient an article provided with openings therein, a spindle shaft equipped at the lower end thereof with a spindle having positioning pins depending therefrom for alignment with the openings in such article positioned thereunder, said shaft being supported for reciprocable movement along the longitudinal axis thereof and for rotational movement thereabout, a pivot arm connected with said shaft for effecting reciprocable movement thereof, a crank for pivoting said arm, an adjustable stop carried by said arm for engagement with said crank to enforce movement of said shaft in a direction displacing the same from such article aligned therewith, a pin carried by said arm in spaced relation with said stop, and a spring carried by said crank for engagement with said last mentioned pin to resiliently urge said shaft in a direction toward such article aligned therewith.

14. The apparatus of claim 13 in which a stripper is carried by said shaft for abutment with an article receiving such positioning pins therein, and in which means are provided for retarding motion of said stripper upon movement of said shaft in a direction displacing the same from such article to strip that article from said positioning pins.

15. The structure of claim 14 in which said stripper comprises a sleeve slidably mounted upon said shaft, and in which the retarding means comprises a collar slidably receiving said stripper sleeve therein and friction means operative between said collar and sleeve.

16. In a spindle adapted for use in rotationally orienting an article having a plurality of openings therein, a head provided by said spindle and having a plurality of spaced apart, axially extending bores therein, a positioning pin removably mounted in each of said bores and extending outwardly therefrom, and spring means for each pin frictionally holding the same within the bore therefor and comprising an elongated spring extending axially along the pin in bearing engagement therewith and with the surrounding wall of the bore therefor, each elongated spring providing adjacent the pin area extending from said head an outwardly bowed portion adapted to frictionally grip the walls of an opening into which the pin is inserted.

17. In orienting apparatus of the character described, an elongated shaft supported for reciprocatory movement along the longitudinal axis thereof, means for reciprocating said shaft, pin means provided by said shaft for entry into an aperture provided therefor in an article axially aligned therewith, a stripper sleeve carried by said shaft for reciprocable movement therewith but being relatively movable with respect thereto through a predetermined longitudinal distance, said stripper sleeve being characterized by being engageable with such article receiving said pin means in the aperture thereof, and movement-retarding structure in operative association with said stripper sleeve to retard movement thereof and effect relatively longitudinal movement between said shaft and stripper sleeve when said shaft is moved in one longitudinal direction to strip such article from said pin means.

18. In a spindle assembly equipped with a positioning pin adapted to align with and enter an opening provided therefor in an article axially aligned therewith, an elongated shaft secured at one end thereof with said pin, means for rotating said shaft, a stop element carried by said shaft, a stop adjacent said shaft and being adapted to be engaged by said element to prevent rotation of said shaft, and means for reciprocating said shaft along the longitudinal axis thereof, said element and stop being positionally arranged so that said shaft is freely rotatable in one longitudinal position thereof but when shifted to another longitudinal position upon entry of said pin into such opening said element is engageable with said stop to terminate rotational movement of said shaft.

19. The spindle assembly of claim 18 in which said means for rotating said shaft comprises a clutch to enable the rotation of said shaft to be terminated upon engagement of said element with said stop.

20. The spindle assembly of claim 18 in which said shaft is equipped with a stripper engageable with such article receiving said pin therein to constrain longitudinal movement of such article upon movement of said shaft in one longitudinal direction to strip such article from said pin.

References Cited in the file of this patent

UNITED STATES PATENTS

| | | |
|---|---|---|
| 685,815 | Chilton | Nov. 5, 1901 |
| 970,140 | Trowbridge | Sept. 13, 1910 |
| 1,154,680 | White | Sept. 28, 1915 |
| 1,270,594 | Brell | June 28, 1918 |
| 1,811,832 | Mayers | June 23, 1931 |
| 1,845,651 | Dickson | Feb. 16, 1932 |
| 2,097,130 | Miller | Oct. 26, 1937 |
| 2,356,698 | Roitz | Aug. 22, 1944 |
| 2,409,511 | Mott | Oct. 15, 1946 |
| 2,609,912 | Engel | Sept. 9, 1952 |
| 2,621,818 | Sestilio | Dec. 16, 1952 |
| 2,639,822 | Sax et al. | May 26, 1953 |
| 2,645,059 | Rowe | July 14, 1953 |
| 2,665,651 | Eagle | Jan. 12, 1954 |
| 2,783,897 | Farquharson | Mar. 5, 1957 |